US008820508B2

(12) United States Patent
Nireki

(10) Patent No.: US 8,820,508 B2
(45) **Date of Patent: *Sep. 2, 2014**

(54) BILL HANDLING APPARATUS

(75) Inventor: Takao Nireki, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 965 days.

This patent is subject to a terminal disclaimer.

(21) Appl. No.: 11/839,818

(22) Filed: Aug. 16, 2007

(65) Prior Publication Data

US 2008/0047802 A1 Feb. 28, 2008

(30) Foreign Application Priority Data

Aug. 22, 2006 (JP) ................................. 2006-225749

(51) Int. Cl.

| | |
|---|---|
| ***G07F 7/04*** | (2006.01) |
| ***G06K 7/00*** | (2006.01) |
| ***G06K 9/00*** | (2006.01) |
| ***G07D 7/00*** | (2006.01) |
| ***G07D 11/00*** | (2006.01) |
| ***B65H 43/00*** | (2006.01) |
| ***G07D 7/12*** | (2006.01) |

(52) U.S. Cl.

CPC ............ *G07D 11/0018* (2013.01); *B65H 43/00* (2013.01); *B65H 2404/611* (2013.01); *G07D 7/12* (2013.01); *B65H 2701/1912* (2013.01); *B65H 2553/44* (2013.01)

USPC ............. 194/207; 347/257; 358/484; 359/17; 359/818; 362/581; 382/135

(58) Field of Classification Search

USPC ........... 194/206, 207; 209/534; 382/135, 325; 359/17, 818; 362/800, 555, 581; 347/257; 358/473, 484

See application file for complete search history.

(56) References Cited

U.S. PATENT DOCUMENTS 6,734,953 B2 5/2004 Numata
7,271,398 B2 * 9/2007 Androsyuk et al. ....... 250/461.1

(Continued)

FOREIGN PATENT DOCUMENTS

CN 1797481 A 7/2006
EP 1 482 457 A2 12/2004

(Continued)

OTHER PUBLICATIONS

U.S. Appl. No. 11/839,787, filed Aug. 16, 2007, Nireki.

(Continued)

*Primary Examiner* — Jeffrey Shapiro

(74) *Attorney, Agent, or Firm* — KMF Patent Services, PLLC; S. Peter Konzel; Kenneth M. Fagin

(57) ABSTRACT

A bill handling apparatus according to one embodiment of the invention has a frame provided with a bill feeding path in which a bill is fed and with side wall portions provided in the width direction of the bill feeding path, a bill reading section installed in the frame to read a fed bill, and a bill identifying section for identifying authentication of the bill read by the bill reading section. The bill reading section is provided with a light guide member to which light is input from a light-emitting device as a light-emitting portion that applies the light to the fed bill, and the light guide member is installed to enter inside the side wall portions.

7 Claims, 9 Drawing Sheets

(56) References Cited

U.S. PATENT DOCUMENTS

| | | | | |
|---|---|---|---|---|
| 2001/0030100 | A1 | 10/2001 | Negishi | |
| 2002/0108891 | A1 | 8/2002 | Dunlop et al. | |
| 2003/0019715 | A1* | 1/2003 | Yoshida et al. | 194/206 |
| 2003/0081197 | A1* | 5/2003 | Zoladz et al. | 356/71 |
| 2004/0051300 | A1* | 3/2004 | Matsui et al. | 283/92 |
| 2004/0164248 | A1* | 8/2004 | Nago et al. | 250/341.7 |
| 2005/0243396 | A1* | 11/2005 | Fujii et al. | 359/224 |
| 2006/0029355 | A1* | 2/2006 | Lin | 385/137 |
| 2006/0137959 | A1 | 6/2006 | Iida et al. | |
| 2008/0047802 | A1 | 2/2008 | Nireki | |
| 2008/0074898 | A1* | 3/2008 | Sommer et al. | 362/583 |

FOREIGN PATENT DOCUMENTS

| | | |
|---|---|---|
| JP | 2001-357429 | 12/2001 |
| JP | 2007-141109 | 6/2007 |
| JP | 2007-141110 | 6/2007 |
| WO | WO 96/23282 | 8/1996 |

OTHER PUBLICATIONS

U.S. Appl. No. 11/839,833, filed Aug. 16, 2007, Nireki.

* cited by examiner

BILL HANDLING APPARATUS

The present disclosure relates to subject matter contained in Japan Patent Application No. 2006-225749 filed on Aug. 22, 2006, which is expressly incorporated herein by reference in its entireties.

BACKGROUND OF THE INVENTION

The present invention relates to a bill handling apparatus for feeding a bill inserted from a bill insertion slot, while reading the fed bill to identify the validity.

Generally, a bill handling apparatus identifies the validity of a bill inserted from a bill insertion slot by a user, and is incorporated into service apparatuses that provides various kinds of products and service corresponding to the bill value judged as being valid, such as, for example, a game media lending machine installed in a game hole, or an automatic dispenser, ticket-vending machine and the like installed in public areas.

The bill handling apparatus is usually provided with operation devices such as a bill feeding mechanism that feeds a bill inserted into a bill insertion slot, bill reading means for executing readout of the fed bill, bill identifying means for identifying the validity (also referred to as authentication judgment) from the read bill information and the like, and control means for driving and controlling the operation devices.

The above-mentioned bill reading means is provided with a photosensor which applies light to the fed bill and detects the reflected light and/or transmitted light, and the bill identifying means compares a detection signal from the photosensor with beforehand stored authorized bill data to identify the validity. In this case, as disclosed in Japanese Laid-Open Patent Publication No. 2001-357429, the bill identification accuracy is improved by detecting the entire width direction of the fed bill. In other words, disclosed in the publication No. 2001-357429 is a technique for forming the bill reading means comprised of the so-called line sensor formed of a light-emitting portion that irradiates almost the entire region of a passage width of the bill in the shape of a slit, and a light-receiving portion comprised of a photodiode array, reading information of the entire width of the passed bill, and thereby improving the identification accuracy of the validity.

Then, the light-emitting portion that irradiates in the shape of a slit is comprised of a light guide member that extends in the width direction of the fed bill and that receives at its one end the light applied from at least one LED, such a light guide member and light-receiving portion are disposed opposite to each other with a bill feeding path positioned therebetween, or disposed in parallel with each other on one side of the bill feeding path, and readout of the bill information is thereby executed.

As described above, in the configuration where the light of the LED that is an emitter is applied to the light guide member, due to characteristics of the light guide member, there is a problem that emission amounts are unstable at its one end and the other end. Therefore, in the case of using, as an irradiation portion, a predetermined length from the center portion where the emission amount of the light guide member is stable to opposite end portions, it is necessary to dispose the opposite end portions of the light guide member to exceed the passage width of the bill, and a problem arises that the bill identifying apparatus is increased in size in the bill passage width direction.

Accordingly, a bill handling apparatus enabling its miniaturization is required.

BRIEF SUMMARY OF THE INVENTION

To achieve the above-mentioned object, a bill handling apparatus according to the present invention is characterized by comprising a frame provided with a bill feeding path in which a bill is fed and with a side wall portion provided in a width direction of the bill feeding path, a bill reading section installed in the frame to read a fed bill, and a bill identifying section for identifying authentication of the bill read by the bill reading section, where the bill reading section is provided with a light guide member to which light is input from a light-emitting device as a light-emitting portion that applies the light to the fed bill, and the light guide member is installed to enter inside the side wall portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the invention will be described below with reference to accompanying drawings.

Figure 1:
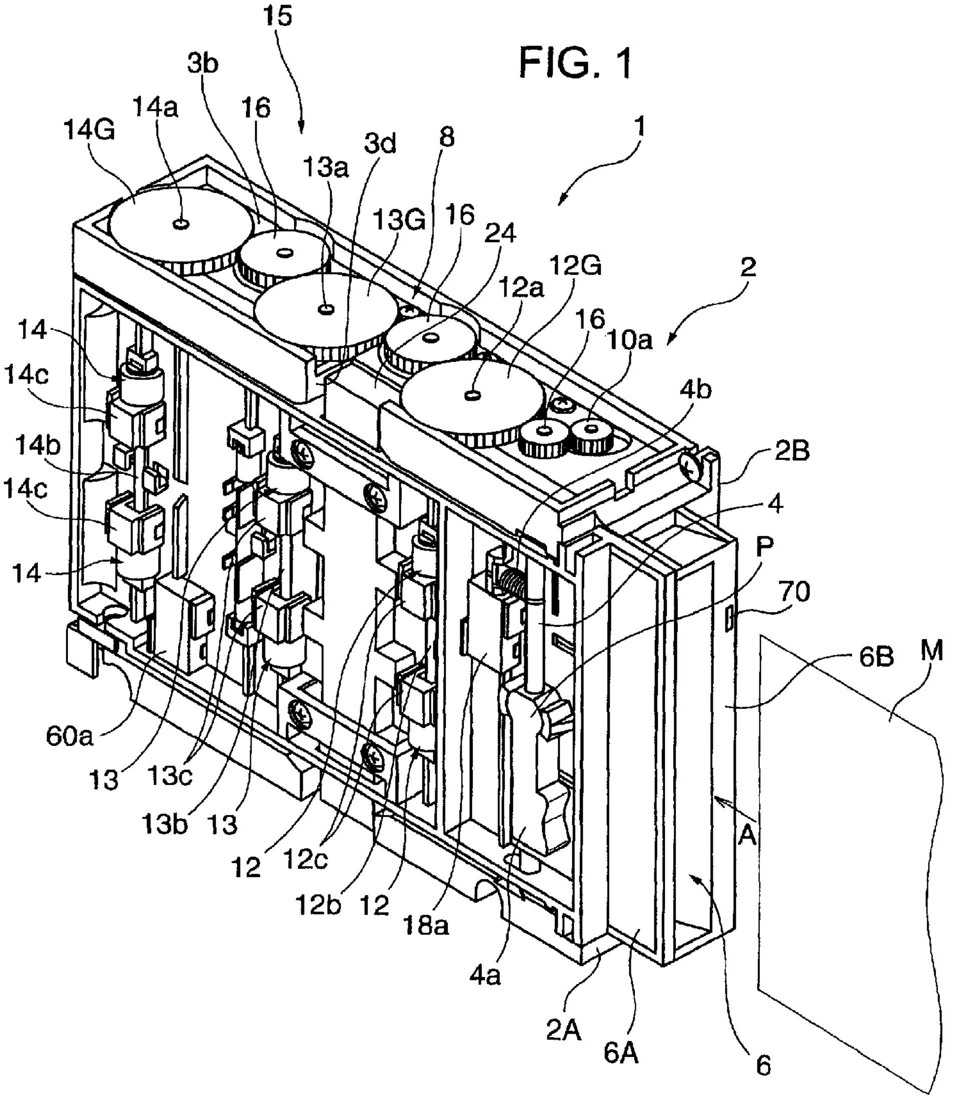
FIG. 1 is a perspective view showing an entire configuration of one embodiment of a bill handling apparatus according to the invention.
Figure 2:
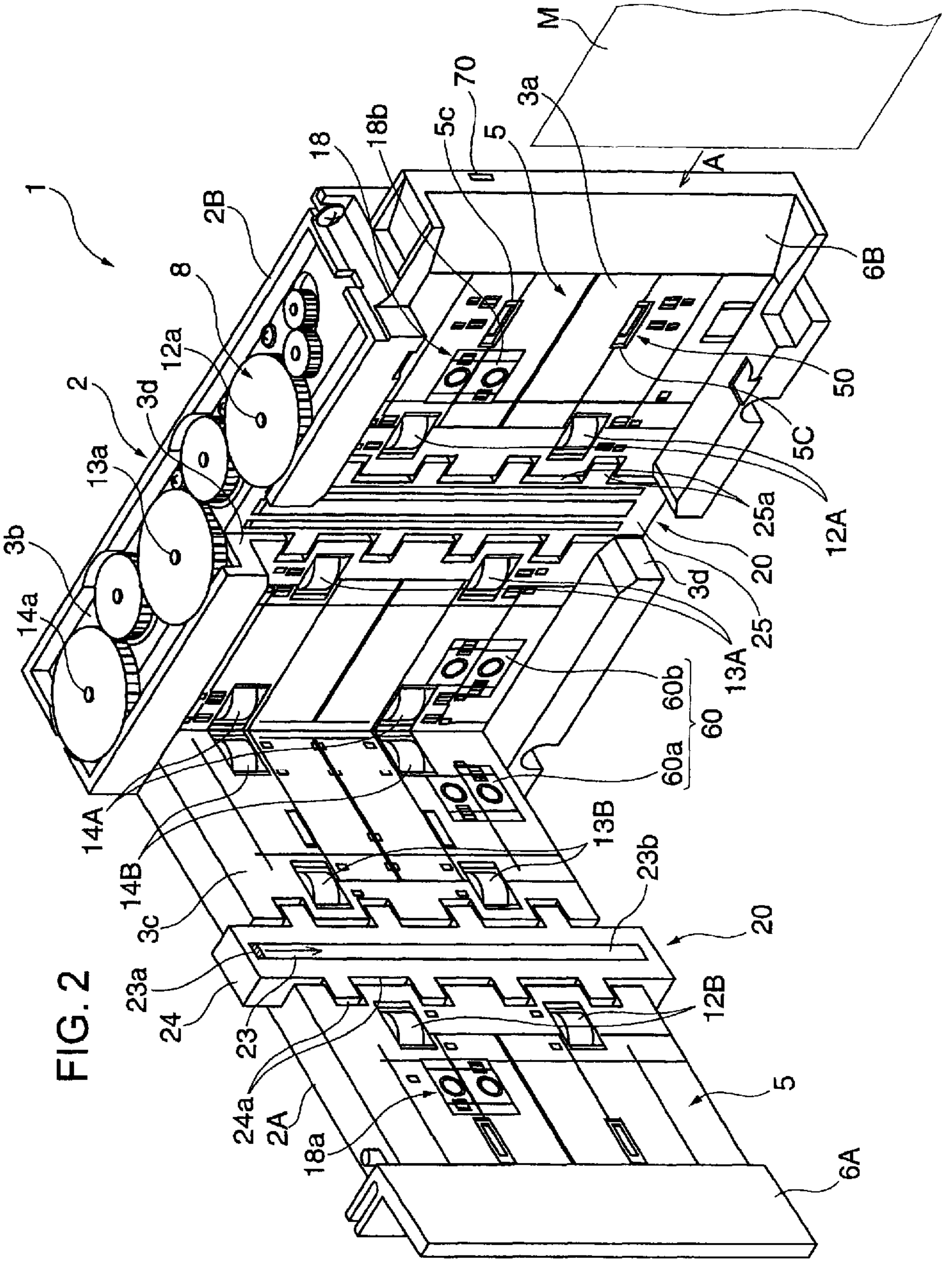
FIG. 2 is a perspective view showing a state where an upper frame is opened with respect to a lower frame.
Figure 3:
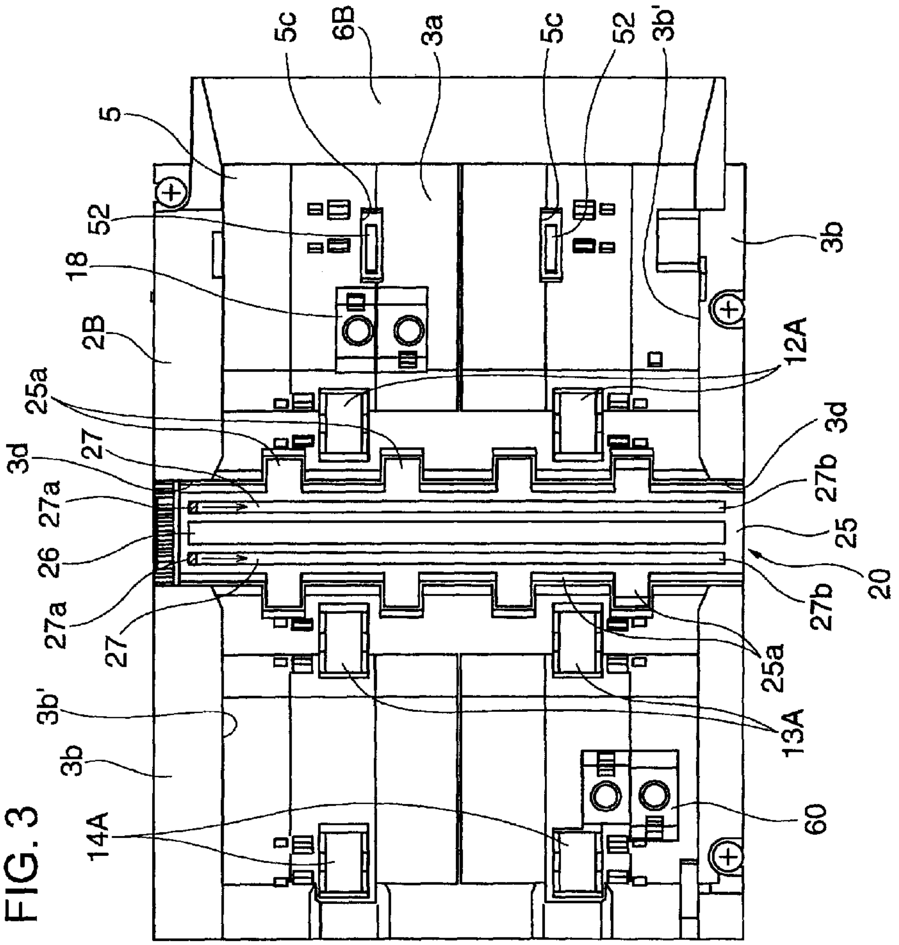
FIG. 3 is a plan view showing a bill feeding path portion of the lower frame.
Figure 4:
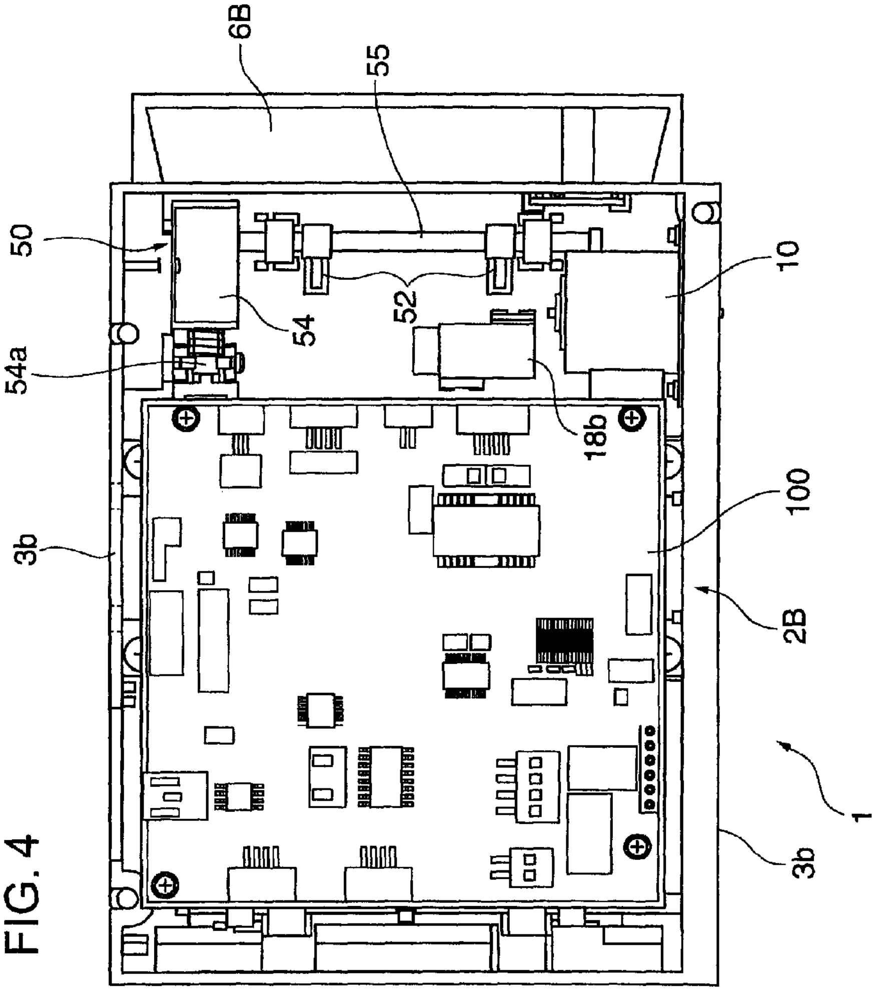
FIG. 4 is a rear elevational view of the lower frame.

FIGS. 1 to 4 are views showing a configuration of a bill handling apparatus according to this embodiment, FIG. 1 is a perspective view showing an entire configuration, FIG. 2 is a perspective view showing a state where an upper frame is opened with respect to a lower frame, FIG. 3 is a plan view showing a bill feeding path portion of the lower frame, and FIG. 4 is a rear elevational view of the lower frame.

A bill handling apparatus 1 of this embodiment is configured to be capable of being incorporated into a game media lending apparatus (not shown) installed among various kinds of game machines such as, for example, slot machines and the like. In this case, the game media lending apparatus may be provided with another apparatus (for example, a bill storage unit, coin identifying apparatus, storage media processing apparatus, power supply apparatus and the like) on the upper or lower side of the bill handling apparatus 1, and the bill handling apparatus 1 may be formed integrally with the other apparatus, or formed separately. Then, when a bill is inserted in such a bill handling apparatus 1 and the validity of the inserted bill is judged, the processing corresponding to the bill value is performed such as the processing for lending game media, the processing of writing in a storage medium such as a prepaid card, or like.

The bill handling apparatus 1 is provided with a frame 2 formed in the shape of a substantially cuboid, and the frame 2 is mounted to a locking portion of the game media lending apparatus not shown in the figure. The frame 2 has a lower frame 2B as a base side and an upper frame 2A openable/closable with respect to the lower frame 2B to cover the lower frame 2B. The frames 2A and 2B are configured to be opened and closed with a base portion as a turn center as shown in FIG. 2.

The lower frame 2B has the shape of a substantially cuboid, and is provided with a bill feeding face 3*a* for feeding a bill, and side wall portions 3*b* formed on the opposite sides of the bill feeding face 3*a*. Meanwhile, the upper frame 2A is configured in the shape of a plate provided with a bill feeding face 3*c*, and when the upper frame 2A is closed to enter between the side wall portions 3*b* on the opposite sides of the lower frame 2B, a clearance (bill feeding path) 5 to feed a bill is formed between opposite portions of the bill feeding face 3*a* and bill feeding face 3*c*.

Then, the upper frame 2A and lower frame 2B are respectively provided with bill insertion portions 6A and 6B adapted to the bill feeding path 5. These bill insertion portions 6A and 6B form a bill insertion slot 6 in the shape of a slit when the upper frame 2A and lower frame 2B are closed, and as shown in FIG. 1, a bill M is inserted inside from a shorter side of the bill along the direction of allow A.

Further, a lock shaft 4 capable of locking in the lower frame 2B is disposed on the front end side of the upper frame 2A. The lock shaft 4 is provided with an operation portion 4*a*, and by operating the operation portion 4*a* to rotate against the biasing force of a biasing spring 4*b*, rotates on a pivot P as a center to release the lock state of the upper frame 2A and lower frame 2B (the state where the frames are closed: overlapping state).

In the lower frame 2B are provided a bill feeding mechanism 8, a bill detecting sensor 18 that detects a bill inserted in the bill insertion slot 6, bill reading means (a bill reading section) 20 that is installed on the downstream side of the bill detecting sensor 18 and that reads information of the bill in a fed state, a shutter mechanism 50 that is installed in the bill feeding path 5 between the bill insertion slot 6 and the bill detecting sensor 18 and that is driven to block the bill insertion slot 6, and control means (circuit control board (a bill identifying section)) 100 for controlling driving of structural members such as the aforementioned bill feeding mechanism 8, bill reading means 20, shutter mechanism 50 and the like, while identifying (performing authentication judgment processing) the validity of the read bill.

The bill feeding mechanism 8 is a mechanism capable of feeding the bill inserted from the bill insertion slot 6 along the insertion direction A, while feeding back the bill in an insertion state toward the bill insertion slot 6. The bill feeding mechanism 8 is provided with a driving motor 10 that is a driving source installed on the lower frame 2B side, and feeding roller pairs 12, 13 and 14 which are driven to rotate by the driving motor 10 and disposed in the bill feeding path 5 at predetermined intervals along the bill feeding direction.

The feeding roller pair 12 is provided with driving rollers 12A disposed on the lower frame 2B side, and pinch rollers 12B disposed on the upper frame 2A side to come into contact with the driving roller 12A. These driving rollers 12A and pinch rollers 12B are installed in two respective locations at predetermined intervals along the direction perpendicular to the bill feeding direction. These driving rollers 12A and pinch rollers 12B are exposed at their parts to the bill feeding path 5.

The driving rollers 12A installed in two respective positions are fixed to a driving shaft 12*a* rotatably supported by the lower frame 2B, and the two pinch rollers 12B are rotatably supported by a spindle 12*b* supported by the upper frame 2A. In this case, a biasing member 12*c* for biasing the spindle 12*b* to the driving shaft 12*a* side is provided in the upper frame 2A, and brings the pinch rollers 12B into contact with the driving roller side 12A by predetermined pressure.

In addition, as in the roller pair 12, the feeding roller pairs 13 and 14 are respectively comprised of two driving rollers 13A, 14A fixed to driving shafts 13*a*, 14*a*, and two pinch rollers 13B, 14B rotatably supported by spindles 13*b*, 14*b*, and the pinch rollers 13B, 14B are brought into contact with the driving rollers 13A, 14A by biasing members 13*c*, 14*c*, respectively.

The feeding roller pairs 12, 13 and 14 are driven in synchronization with one another by a driving force conveying mechanism 15 coupled to the driving motor 10. The driving force conveying mechanism 15 is comprised of a gear train disposed rotatably on one side wall portion 3*b* of the lower frame 2B. More specifically, the mechanism 15 is formed of the gear train having an output gear 10*a* fixed to an output shaft of the driving motor 10, input gears 12G, 13G and 14G which are sequentially engaged in the output gear 10*a* and mounted on the end portions of the driving shafts 12*a*, 13*a* and 14*a*, respectively and idle gears 16 installed between the gears.

According to the above-mentioned configuration, when the driving motor 10 is driven forward, each of the feeding roller pairs 12, 13 and 14 is driven to feed the bill in the insertion direction A, while when the driving motor 10 is driven reversely, being driven reversely to send the bill back to the bill insertion slot side.

Figure 5:
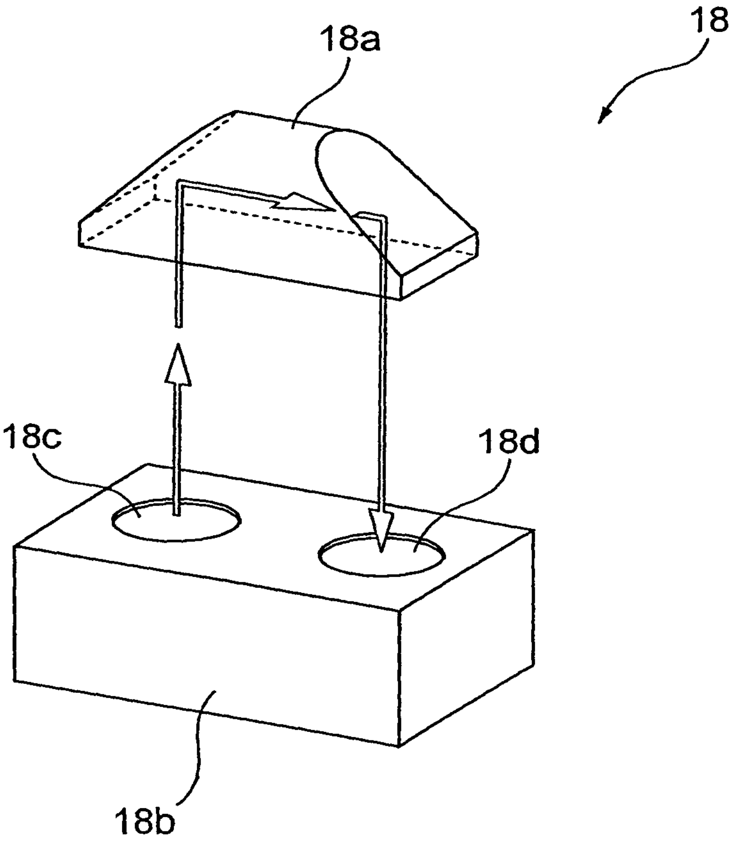
FIG. 5 is a perspective view showing a configuration of a bill detecting sensor.

The bill detecting sensor 18 is to generate a detection signal in detecting a bill inserted in the bill insertion slot 6, and in this embodiment, is installed between rotating pieces constituting the shutter mechanism described later, and the bill reading means 20 for reading the bill. The bill detecting sensor 18 is comprised of, for example, an optical type sensor, more specifically, a regression reflective photosensor, and as shown in FIG. 5, formed of a prism 18*a* installed on the upper frame 2A side and a sensor body 18*b* installed on the lower frame 2B side. More specifically, the prism 18*a* and sensor body 18*b* are arranged in such a manner that light emitted from a light-emitting portion 18*c* of the sensor body 18*b* is detected by a light-receiving portion 18*d* of the sensor body 18*b* thorough the prism 18*a*. When a bill is passed through the bill feeding path 5 positioned between the prism 18*a* and sensor body 18*b* and the light is not detected in the light-receiving portion 18*d*, the sensor 18 generates a detection signal.

In addition, the bill detecting sensor 18 may be comprised of a mechanical type sensor, as well as the optical type sensor.

On the downstream side of the bill detecting sensor 18 is installed the bill reading means 20 for reading the bill information on the bill in a fed state. The bill reading means 20 is only required to have a configuration for irradiating the bill with the light to read the bill information when the bill is fed by the bill feeding mechanism 8, and generating a signal to enable the validity (authentication) of the bill to be judged, and in this embodiment, is configured to perform readout of the bill by applying the light from the opposite sides, and detecting the transmitted light and reflected light by a light-receiving device such as a photodiode or the like. Then, the optical signal on the read bill information undergoes photoelectric transformation, and is compared with the beforehand stored data of the authorized bill in the bill identifying means, and the authentication of the fed bill is thus judged.

On the downstream side of the bill insertion slot 6 is disposed the shutter mechanism 50 that blocks the bill insertion slot 6. The shutter mechanism 50 is configured to be normally in a state for opening the bill insertion slot 6, closed when a bill is inserted and the bill detecting sensor 18 detects a rear end of the bill (the bill detecting sensor 18 is OFF), and thus prevent fraud and the like.

More specifically, the shutter mechanism 50 has the rotating pieces 52 that are rotatably driven to appear at predetermined intervals in the direction perpendicular to the bill feeding direction in the bill feeding path 5, and a solenoid (pull-type) 54 that is a driving source that rotatably drives the rotating pieces 52. In this case, the rotating pieces 52 are installed in two locations in the width direction of a spindle 55, and long holes 5*c* extending in the bill feeding direction are formed in the bill feeding face 3*a* of the lower frame 2B constituting the bill feeding path 5 to cause respective rotating pieces 52 to appear.

Further, on the downstream side of the bill reading means 20 is provided a bill passage detecting sensor 60 that detects passage of the bill. The bill passage detecting sensor 60 is to generate a detection signal when the bill judged as being valid is further fed to the downstream side, and the sensor 60 detects the rear end of the bill. Based on the occurrence f the detection signal, the energization of the solenoid 54 is released (the solenoid is OFF), and the driving shaft 54*a* moves in the protruding direction by the biasing force of the biasing spring provided in the driving shaft 54*a*. By this means, the rotating pieces 52 constituting the shutter mechanism are rotatably driven to open the bill feeding path via the spindle 55 synchronized with the driving shaft 54*a*.

The bill passage detecting sensor 60 is, as in the bill detecting sensor 18, comprised of an optical type sensor (regression reflective photosensor), and formed of a prism 60*a* installed on the upper frame 2A side and a sensor body 60*b* installed on the lower frame 2B side. Naturally, the bill passage detecting sensor 60 may be comprised of a mechanical type sensor, as well as the optical type sensor.

In the vicinity of the bill insertion slot 6 is provided an informing device that informs that the bill is being inserted in a visible manner. Such an informing device can be comprised of, for example, an LED 70 that blinks, is lit when a user inserts a bill in the bill insertion slot 6, and informs the user of the bill being handled. It is thereby possible to prevent the user from erroneously inserting a next bill.

Figure 6:
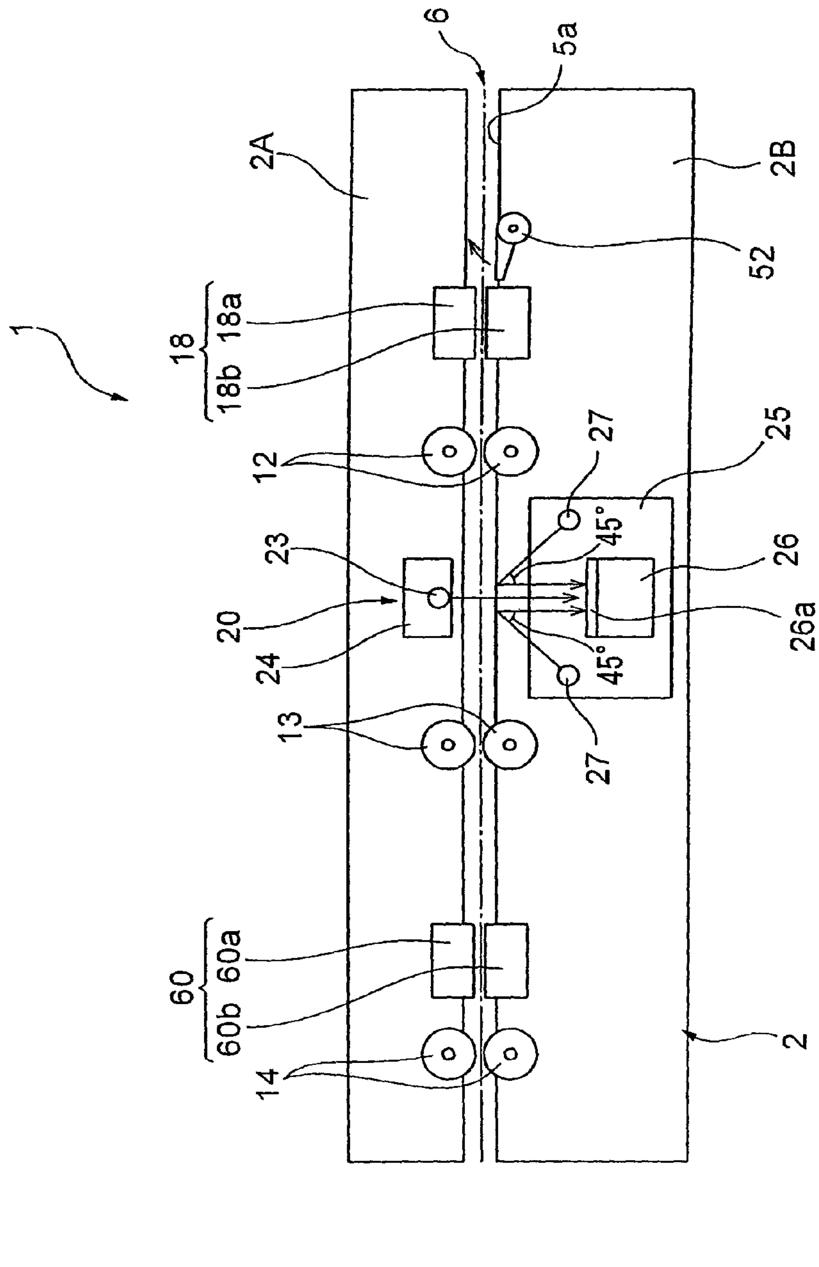
FIG. 6 is a view schematically showing the configuration of the bill handling apparatus.

Referring to FIGS. 2, 3 and 6, described below is the configuration of the bill reading means 20 installed in the upper frame 2A and lower frame 2B.

The bill reading means 20 has a light-emitting unit 24 provided with a first light-emitting portion 23 that is disposed on the upper frame 2A side and that is capable of emitting slit-shaped light over the feeding path width direction on the upper side of the fed bill, and a line sensor 25 disposed on the lower frame 2B side.

The line sensor 25 installed on the lower frame 2B side has a light-receiving portion 26 disposed opposite to the first light-emitting portion 23 in a manner of sandwiching the bill, and second light-emitting portions 27 that are disposed adjacent to opposite sides of the light-receiving portion 26 on the bill feeding direction and that are capable of emitting slit-shaped light.

The first light-emitting portion 23 disposed opposite to the light-receiving portion 26 of the line sensor 25 functions as a light source for transmission. As shown in FIG. 2, the first light-emitting portion 23 is formed as the so-called light guide member 23*b* made of a synthetic resin formed in the shape of a rectangle rod, and preferably, has functions of receiving emitted light from the light-emitting device 23*a* such as an LED and the like installed at the end portion, and emitting the light while guiding the light along the longitudinal direction. By this means, it is possible to apply the slit-shaped light uniformly to the entire region in the width direction of the feeding path of the fed bill with a simple configuration.

In addition, the light-receiving portion 26 of the line sensor 25 is disposed in the shape of a line in parallel with the first light-emitting portion 23 that is the light guide member, and formed in the shape of a thin plate which extends in the direction of intersecting the bill feeding path 5, and which is formed in the shape of a band having a width to the extent of not affecting the sensitivity of a light-receiving sensor, not shown, provided in the light-receiving portion 26. More specifically, the portion 26 has a configuration where a plurality of CCDs (Charge Coupled Device) is provided in the shape of a line in the center in the thickness direction of the light-receiving portion 26, and a Selfoc lens array 26*a* is arranged in the shape of a line in a position above the CCDs to gather the transmitted light and reflected light.

The second light-emitting portions 27 of the line sensor 25 function as light sources for reflection. As shown in FIG. 3, each of the second light-emitting portions 27 is formed, as in the first light-emitting portion 23, as the so-called light guide member 27*b* made of a synthetic resin formed in the shape of a rectangle rod, and preferably, has functions of receiving emitted light from the light-emitting device 27*a* such as an LED and the like installed at the end portion, and emitting the light while guiding the light along the longitudinal direction. By this means, it is possible to apply the slit-shaped light uniformly to the entire region in the width direction of the feeding path of the fed bill with a simple configuration.

In addition, each of the second light-emitting portions 27 is capable of applying the light to the bill at an elevation angle of 45 degrees, and is disposed so that the reflected light from the bill is received in the light-receiving portion 26 (light-receiving sensor). In this case, the light emitted from the second light-emitting portion 27 is input to the light-receiving portion 26 at an angle of 45 degrees, but the incident angle is not limited to 45 degrees, and can be set as appropriate in ranges capable of reliably receiving the reflected light. Therefore, an arrangement of the second light-emitting portions 27 and second light-receiving portion 26 can be modified in design as appropriate corresponding to the configuration of the bill handling apparatus. Further, the second light-emitting portions 27 are installed on the opposite sides with the light-receiving portion 26 sandwiched therebetween to emit the light from the opposite sides respectively at an angle of 45 degrees. This is because when a tear, crease and the like are present on the bill surface and the light is applied to a concavo-convex portion caused by a portion of the tear, crease or the like from only one side, a shaded area may be caused in the concavo-convex portion by shielding the light. Therefore, by emitting the light from the opposite sides, it is possible to prevent the concavo-convex portion from being darkened, and to obtain image data with higher accuracy than in emission from one side. Naturally, the second light-emitting portion 27 may be configured to be installed on only one side.

The line sensor 25 is exposed to the bill feeding path 5, and is thereby provided with concavo-convex portions 25*a*, as shown in FIG. 2, on opposite ends of its surface portion (that is substantially the same plane as the feeding face 3*a*) in the bill feeding direction to catch the fed bill hardly. Further, as in the line sensor 25, the light emitting unit 24 is provided with concavo-convex portions 24*a*, as shown in FIG. 2, on opposite ends of its surface portion in the bill feeding direction to catch the fed bill hardly.

The second light-emitting portion 27 (hereinafter, also referred to as the light guide member 27) formed as a light guide member of the line sensor 25 is installed to enter inside the side wall portion 3*b*. In this case, as shown in FIG. 3, the light guide member 27 entering the side wall portion 3*b* is that an end portion (preferably opposite end portions) of the light guide member 27 extending in the width direction of the bill feeding path is only required to be positioned outward in the width direction from the side wall portion 3*b* forming the frame 2, and more specifically, to be preferably installed in a position more outward in the width direction than an inner face 3*b*' defining the side wall portion 3*b*. In addition, the inner faces 3*b*' are defined by regulating wall faces that regulate the opposite sides of the fed bill when the bill feeding path 5 is viewed in a plan view as in FIG. 3.

For a length by which the end portion of the light guide member 27 enters the side wall potion 3*b*, it is preferable to consider the emission amount of the light guide member. In other words, generally, in a light guide member for coupling light from one end side and emitting the propagated light, there is a tendency that the emission amounts decrease at the opposite end portions. Therefore, the opposite end portions that are such regions where the emission amounts decrease are made positioned inside the side wall portions 3*b*, and it is thus possible to improve the bill reading accuracy by using the area where the emission amount is adequate.

Figure 7:
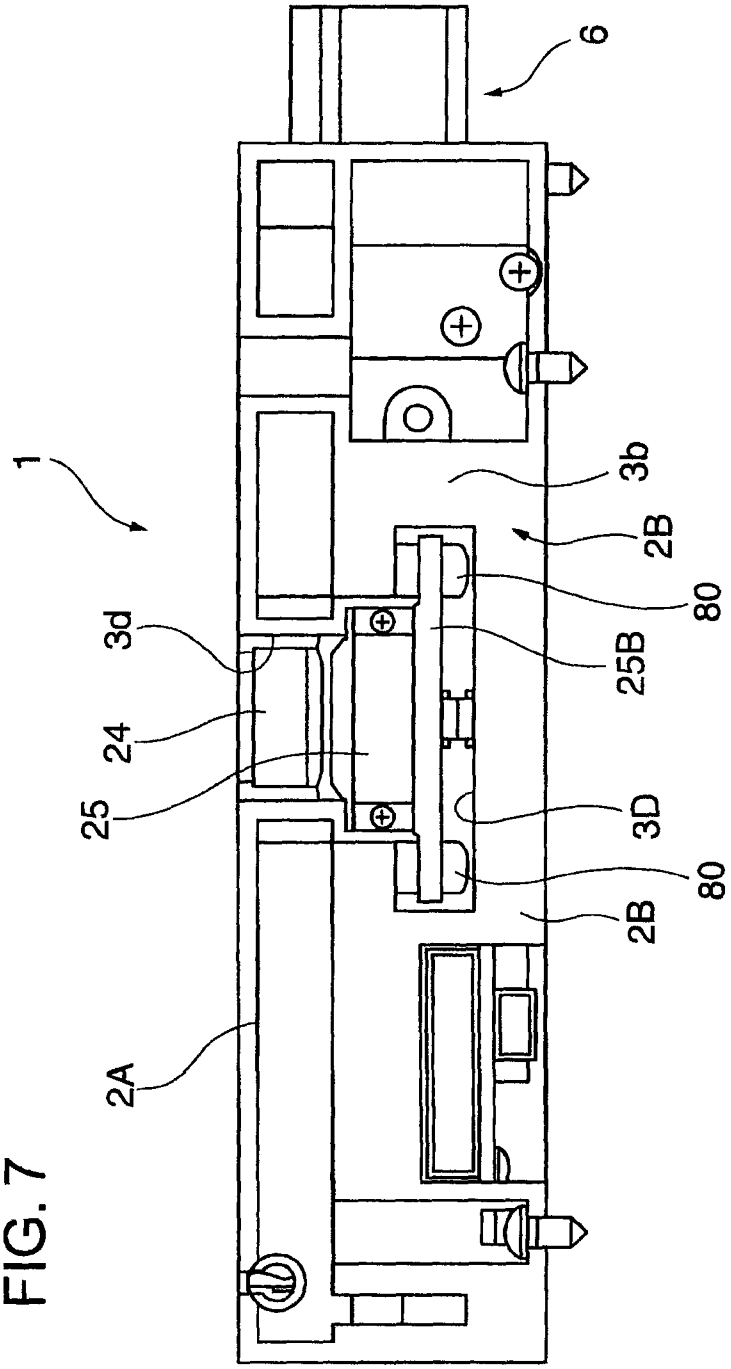
FIG. 7 is a side elevational view of the bill handling apparatus.

Further, in the above-mentioned configuration, it is preferable forming an opening 3D in the side wall portion 3*b* constituting the frame so that the line sensor 25 slides into the opening and is capable of being installed inside. This opening 3D is configured in a similar shape to that of the side face portion of the line sensor 25, and as shown in FIG. 7, is formed in a substantially convex shape. In other words, the line sensor 25 is provided with the light guide member 27 extending in the width direction and the light-receiving portion 26, and is mounted on a sensor board 25A installed with a circuit for causing the light guide member 27 to emit light, a detecting circuit that detects the light incident upon the CCDs provided in line-shape to constitute the light receiving portion 26, an amplifier that amplifies an output of the detection circuit, an A/D converter that converts the amplified output signal into a digital signal, a control section to control these kinds of devices, and the like. The sensor board 25A is attached to a hold frame 25*b* in the shape of a substantially rectangle. Then, the hold frame 25B for holding the line sensor 25 and sensor board 25A is formed in a substantially convex portion as viewed from the side, and the opening 3D is configured in the shape corresponding to such a shape.

Figure 8:
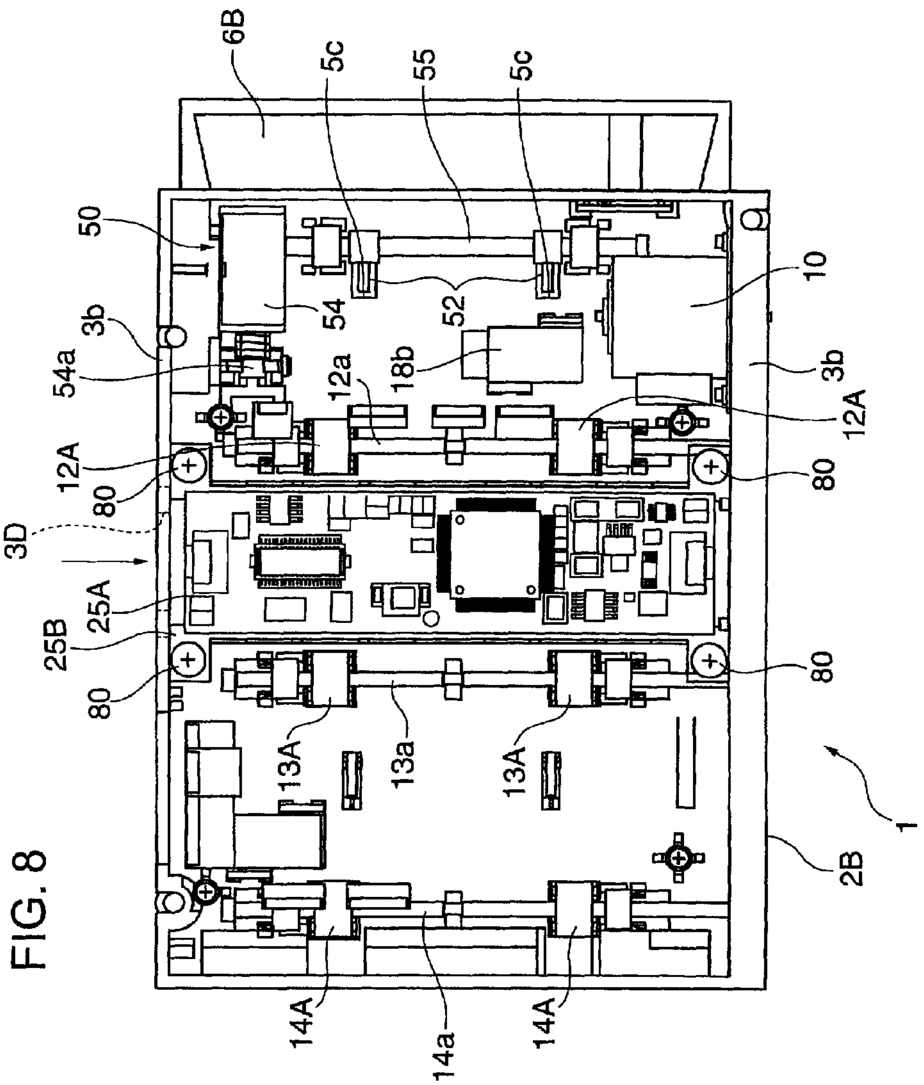
FIG. 8 is another rear elevational view of the lower frame, showing a state where a control board is removed.

The line sensor 25 is slid and installed in a predetermined position of the lower frame 2*b*, together with the hold frame 25B, through the opening 3D, as shown by the arrow in FIG. 8. More specifically, the line sensor 25 and sensor board 25A slid and inserted through the opening 3D formed in the lower frame 2B are fixed to predetermined positions in the lower frame 2B by screwing screws 80 into screw holes respectively formed in four corner portions of the hold frame 25B.

Thus, according to the configuration where the opening 3D is formed in the lower frame 2B constituting the apparatus body, and the line sensor 25 is slid and attached through the opening portion, it is possible to shorten the length of the entire apparatus in the bill feeding path width direction, and to install the line sensor 25 without decreasing the strength of the side wall portion 3*b*.

Figure 9:
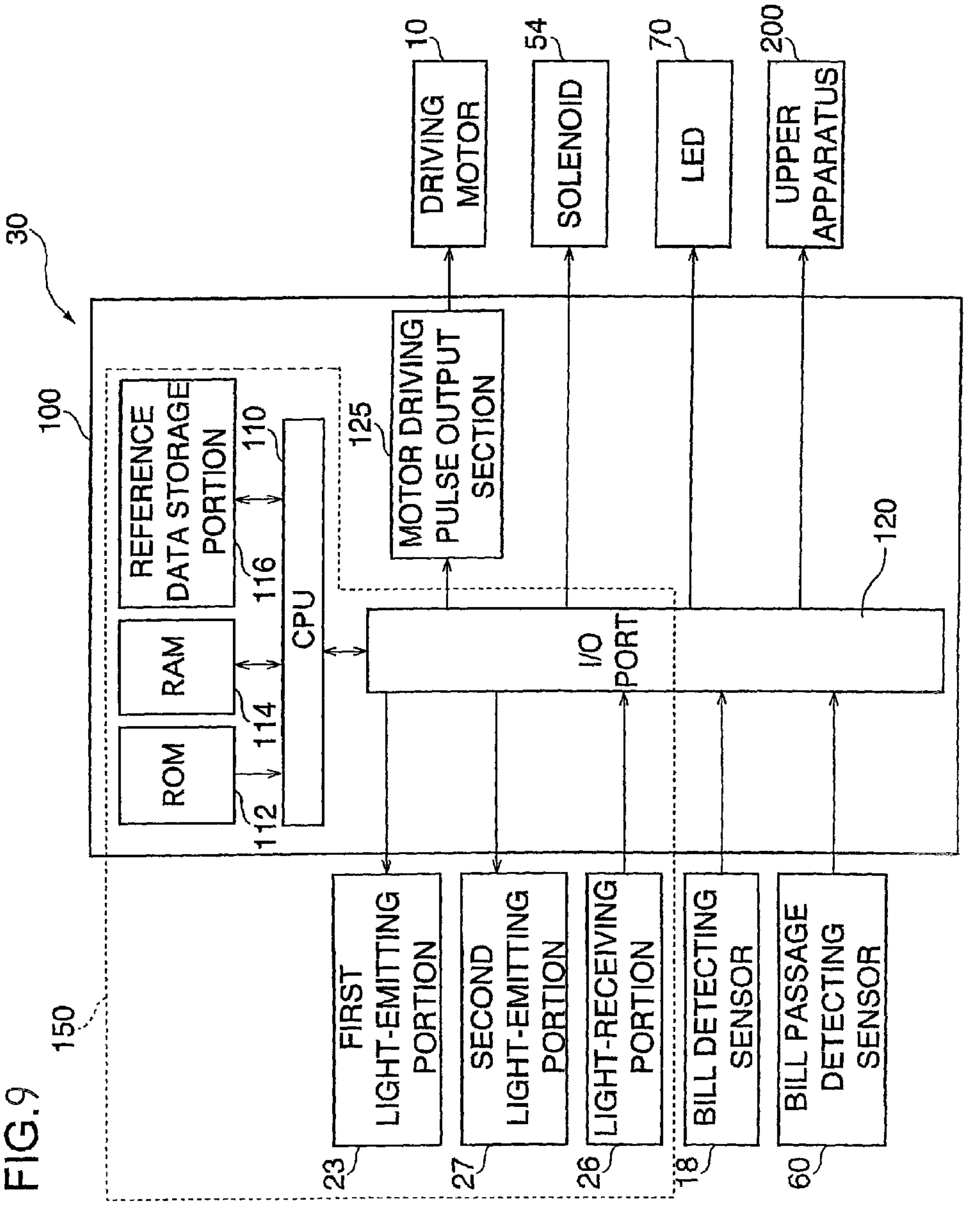
FIG. 9 is a block diagram illustrating a control system of the bill handling apparatus.

FIG. 9 is a block diagram illustrating a schematic configuration of the control means for controlling the bill handling apparatus 1 provided with the bill feeding mechanism 8, bill reading means 20, shutter mechanism 50 and the like.

The control means 30 is provided with a control circuit board 100 for controlling the operation of each driving apparatus as described above. On the control circuit board 100 are mounted a CPU (Central Processing Unit) 110 constituting the bill identifying means, ROM (Read Only Memory) 112, RAM (Random Access Memory) 114 and a reference data storage section 116.

The ROM 112 stores operation programs for driving apparatuses such as the driving motor 10, solenoid 54, LED 70 and the like, various kinds of programs such as an authentication judgment program and the like, and permanently data. The CPU 110 operates according to the programs stored in the ROM 112, inputs and outputs signals to/from the driving apparatuses as described above via an I/O port 120, and controls the operation of the bill handling apparatus. In other words, the CPU 110 is connected to a driving motor driving circuit 125 (driving motor 10), solenoid 54, and LED 70 via the I/O port 120. The driving apparatuses are controlled in operation by control signals from the CPU 110 according to the operation programs stored in the ROM 112. Further, the CPU 110 receives a detection signal from the bill detecting sensor 18, and a detection signal from the bill passage detecting sensor 60 via the I/O port 120, and based on these detection signals, controls forward/reverse driving of the driving motor 10, blinking of the LED 70, and driving of the solenoid 54.

The RAM 114 stores the data and programs used for the CPU 110 to operate, and acquires the received light data of a bill targeted for judgment to temporarily store. The data is compared with the reference data stored in the reference data storage section 116, and the authentication judgment processing is thereby performed. In addition, in this embodiment, the reference data is stored in the dedicated reference data storage section 116, but may be stored in the ROM 112. Further, although the reference data of the genuine bill may be stored beforehand in the reference data storage section 116, for example, the genuine bill is fed through the bill feeding mechanism 8 to acquire the received light data, and the data may be stored as the reference data.

Further, the CPU 110 is connected to the first light-emitting portion (light guide member) 23 in the light-emitting unit 24, and the light-receiving portion 26 and second light-emitting portions (light guide members) 27 in the line sensor 25 via the I/O port 120. These portions constitute a bill authentication judgment section 150 together with the CPU 110, ROM 112, RAM 114 and reference data storage section 116, and control the operations required for the authentication judgment in the bill handling apparatus 1.

Furthermore, the CPU 110 is connected to a control section of the game media lending apparatus into which the bill handling apparatus 1 is incorporated, and an upper apparatus 200 such as a host computer and the like of an external apparatus, via the I/O port 120, and transmits various kinds of signals (such as information of the bill, alarm signal and the like) to the upper apparatus.

According to the bill handling apparatus configured as described above, when the bill detecting sensor 18 detects insertion of a bill and becomes ON, the driving motor 10 is forward driven, and the LED 70 is lit. The feeding roller pairs 12, 13 and 14 are thereby driven to rotate in the bill insertion direction to feed the bill inside the apparatus, and the user is notified of the bill being handled to prevent insertion of an additional bill.

The bill is fed inside the apparatus, the bill reading means 20 thereby reads the information, and the control means 30 executes the authentication judgment processing. At this point, in this embodiment, when the bill detecting sensor 18 detects the rear end of the bill (the bill detecting sensor 18 is OFF), the solenoid 54 is energized, and the rotating pieces 52 are thereby driven to rotate and block the bill insertion slot 6.

When the bill is judged as being genuine in the above-mentioned authentication judgment processing, the bill is further fed to the downstream side. At this point, to be able to support money-back processing and the like that would occur due to some reason, the processing for causing the bill to temporarily wait may be performed. Then, in the stage where the rear end of the bill further fed to the downstream side is detected by the bill passage detecting sensor 60, the driving of the driving motor 10 is halted. With the halt, the driving of the solenoid 54 is made OFF (energization is canceled) to withdraw the rotating pieces 52 from the bill feeding path 5, the bill insertion opening 6 is opened, and the LED 70 is extinguished.

In addition, when the bill is judged being not genuine in the above-mentioned authentication judgment processing, the processing for driving the driving motor 10 reversely is executed in this stage, the shutter mechanism 50 is opened, and the bill is sent back toward the bill insertion opening side. In this send-back processing, in the stage where the rear end of the bill is detecting by the bill detecting sensor 18, the LED 70 is extinguished.

In the bill handling apparatus 1 configured as described above, the light-emitting portion 27 provided in the line sensor 25 in the bill reading means 20 is configured as a light guide member, and emits the entire width direction of the fed bill, and it is thereby possible to improve the identification accuracy. Further, the light guide member 27 has the configuration where light is input from the light-emitting device 27*a* such as an LED and the like, and applied to the bill being fed, and the cost is thereby reduced as compared with the configuration where a plurality of LEDs or the like is arranged. Further, as shown in FIG. 3, the light guide member 27 is installed to enter inside at its opposite ends the side wall portions 3*b* of the frame constituting the apparatus body, and the entire apparatus is thereby made compact. Further, in the light guide member 27, since the opposite ends where emission amounts generally decrease enter the side wall portions 3*b*, it is possible to avoid regions where the bill identification accuracy is unstable, and to improve the bill identification accuracy.

Further, as shown in FIG. 3, the light-emitting device 27*a* is installed in the end portion of the light guide member 27, and thus enters the side wall portion 3*b*, and the entire apparatus is thereby made compact as compared with the configuration, for example, where a plurality of LEDs is arranged to form a light-emitting portion.

In addition, in the configuration of the frame of the apparatus body as described above, the notch concave portions 3*d* are formed in the side wall portions 3*b* to position the end portions of the light guide member 27. As shown in FIG. 2, the notch concave portions 3*d* are formed to expose the bill feeding face 3*a* on the lower frame 2B side, and configured so that the end portions of the light guide member 27 are positioned in the notch portions. Further, when the upper frame 2A is put on the lower frame 2B to close, the opposite end portions of the light-emitting unit 24 provided with the light-guide member 23 provided on the upper frame 2A side are positioned inside the notch concave portions 3*d*, and it is thereby possible to reduce the size not only in the width direction of the bill feeding path but also in the thickness direction. Furthermore, since the opposite end portions of the light guide member 23 provided in the light-emitting unit 24 are also are positioned inside the notch concave portions 3*d* as in the light guide member 27, it is possible to miniaturize in the width direction of the bill feeding path, while since the end portions where the emission amounts decrease are positioned in the notch concave portions formed in the side wall portions 3*b*, it is possible to avoid regions where the bill identification accuracy is unstable, and to improve the bill identification accuracy.

In the foregoing, the embodiment of the invention is described, but it is a feature of the invention that a light-emitting portion constituting the bill reading means is a light guide member, and that the light guide member is installed to be positioned inside the side wall portions of the frame, and the other configurations are capable of being modified as appropriate. For example, the configuration and arrangement pattern of the reading means (sensor) for reading a bill, method of reading the bill, method of performing the bill authentication judgment processing and the like are not limited to the above-mentioned embodiment, and are capable of being carried into practice with various modifications thereof.

The bill handling apparatus of the invention is capable of being incorporated into various kinds of apparatuses that provide products and/or service by inserting a bill, while being not limited to a game media lending apparatus. Further, this embodiment describes the apparatus for handling bills as an example, but the invention is applicable to apparatuses for making an authentication judgment on gold certificates, securities and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A bill handling apparatus comprising:

a lower frame having:

a first bill feeding face for feeding a bill; and a pair of first and second side wall portions formed on opposite sides in a width direction of the first bill feeding face;

an upper frame being openable and closable with respect to the lower frame so as to cover the lower frame, the upper frame having:

a second bill feeding face configured so that a clearance serving as a bill feeding path for feeding the bill is formed between the first bill feeding face of the lower frame and the second bill feeding face faced to the first bill feeding face with the upper frame being in a closed state in which the upper frame enters between the pair of side wall portions of the lower frame; and a bill reading section installed in the upper frame and the lower frame so as to be formed in a width direction of the bill feeding path in order to read information across a full width of the bill fed on the bill feeding path, wherein:

the bill reading section includes:

a first light-emitting portion disposed on the second bill feeding face of the upper frame, the first light-emitting portion configured to emit slit-shaped light in the width direction of the bill feeding path at a side of one face of the bill; and a second light-emitting portion disposed on the first bill feeding face of the lower frame, the second light-emitting portion configured to emit slit-shaped light in the width direction of the bill feeding path at a side of the other face of the bill; wherein the first light-emitting portion of the upper frame and the second light-emitting portion of the lower frame each have a longitudinal length greater than the width of the bill feeding path formed by the first and second bill feeding faces, and each of the first and second light-emitting portion have first and second terminal end portions that protrude in a feeding width direction of the bill more significantly than the first and second bill feeding faces which form the bill feeding pathway through which the bill is fed between the pair of side wall portions;

the first and second light-emitting portions are configured to emit and guide light along their respective longitudinal lengths; and the first and second side wall portions of the lower frame are provided with notch concave portions, respectively, so that both of the first and second terminal end portions of the second light-emitting portion of the lower frame and both of the first and second terminal end portions of the first light-emitting portion of the upper frame in the closed state with respect to the lower frame are positioned in the notch concave portion.

2. The bill handling apparatus according to claim 1, wherein:

light emitted from the both end portions of the second light-emitting portion of the lower frame and the both end portions of the first light-emitting portion of the upper frame is not utilized as light for reading the bill.

3. The bill handling apparatus according to claim 1, wherein:

the first light-emitting portion has a first light guide member;

the second light-emitting portion has a second light guide member;

the first light-emitting portion of the upper frame and the second light-emitting portion of the lower frame have light-emitting devices disposed at the first terminal end portions of the first light guide member and the second guide member, respectively;

the light-emitting devices are positioned in the notch concave portion formed in the first side wall portion, together with the first end portions of the first light guide member and the second guide member; and the light-emitting devices positioned in the notch concave portion of the first side wall portion emit light so that the light is incident on the first light guide member and the second light guide member from the first terminal end portions toward the second terminal end portions of the first and second light guide members, the second terminal end portions being positioned in the notch concave portion formed in the second side wall portion.

4. The bill handling apparatus according to claim 1, wherein:

the first and second side wall portions of the lower frame have inner faces, respectively; and the inner faces are regulating wall faces for regulating the fed bill in the width direction from both sides of the bill feeding path.

5. The bill handling apparatus according to claim 1, wherein:

the notch concave portions formed in the pair of side wall portions have a depth enough to expose the first bill feeding path of the lower frame.

6. The bill handing apparatus according to claim 1, wherein:

when the upper frame is closed at the lower frame, the upper frame is disposed between said one pair of side wall portions in the width direction of the bill feeding path of the lower frame so that an opposite face to the first bill feeding face of the upper frame is substantially flat with respect to a top face of the side wall portion of the lower frame.

7. A bill handing apparatus comprising:

a frame having a pair of oppositely disposed side wall portions, each of the sidewall portions including a notch concave portion extending from an inside wall and to an outside wall thereof, the inside wall of each sidewall portion oppositely disposed from one another in a bill width direction so as to define a bill feeding path through which a bill is configured to be fed;

a bill reading section installed in the frame and configured to read a fed bill; and a bill identifying section configured to identify authenticity of a bill read by the bill reading section, wherein:

the bill reading section has a light guide member to which light is input from a light-emitting device as a light-emitting portion for emitting light to a fed bill;

the light guide member is a rod-like member extending from respective notch concave portions of the oppositely disposed side wall portions and across the bill feeding path in the bill width direction of the bill feeding path, the light guide member having a light guide member end portion including the light-emitting device and guiding light along a longitudinal direction of the light guide member from one end of the light-guide member to another end of the light guide member;

the light guide member end portion and the light-emitting device are installed so as to be received into at least one of the notch concave portions of the side wall portions of the frame so as to be positioned outside of the bill feeding path defined by the inside walls of the sidewall portions; and a portion other than the light guide member end portion of the light guide member is disposed in the bill feeding path defined by the inner walls of the oppositely disposed side wall portions of the frame so as to be utilized as the light-emitting portion configured to read a bill.

* * * * *